UNITED STATES PATENT OFFICE.

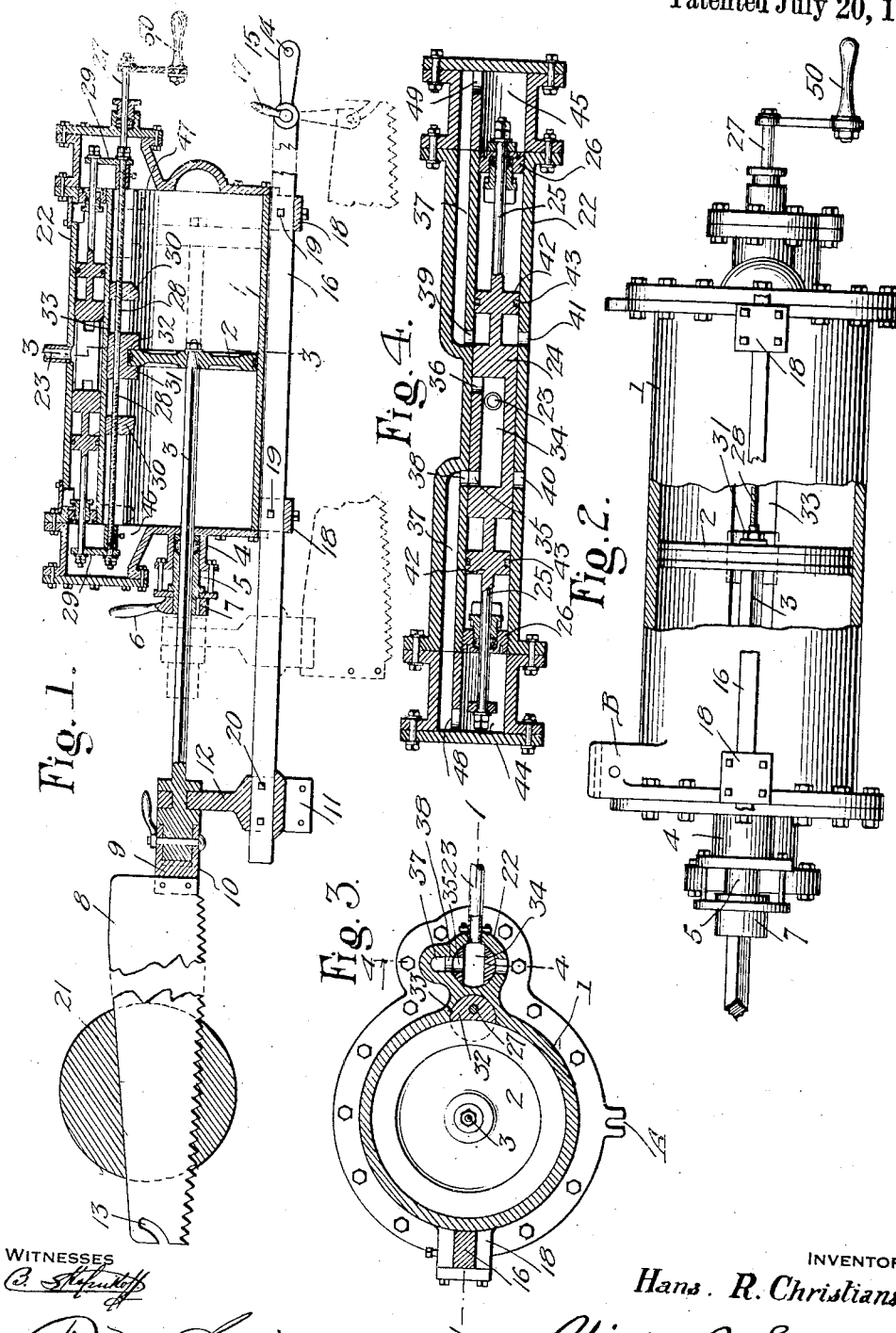

HANS R. CHRISTIANSEN, OF BROOKLYN, NEW YORK.

PNEUMATIC MOTOR.

1,347,444.  Specification of Letters Patent.  Patented July 20, 1920.

Application filed September 21, 1917. Serial No. 192,523.

*To all whom it may concern:*

Be it known that I, HANS R. CHRISTIANSEN, a citizen of the United States, residing at Brooklyn, in the county of Kings and State of New York, have invented new and useful Improvements in Pneumatic Motors, of which the following is a specification.

This invention relates to compressed air motors and has for an object the provision of a motor having novel means for regulating the stroke of the piston, the purpose being to provide a motor adapted for the operation of a tool, such as a saw, wherein the length of the stroke may be regulated by adjusting the length of the piston stroke.

With the above and other objects in view, the invention consists in the novel construction, combination and arrangement of parts, herein fully described, illustrated and claimed.

In the accompanying drawings:—

Figure 1 is a longitudinal section through the pneumatic motor taken diametrically of the cylinder and piston on the line 1—1 of Fig. 3.

Fig. 2 is a bottom plan view of the motor, partly broken away.

Fig. 3 is a cross section on the line 3—3 of Fig. 1.

Fig. 4 is an enlarged section on the line 4—4 of Fig. 3.

The pneumatic saw contemplated in this invention, comprises as one of the essential features thereof a compressed air motor which embodies a cylinder 1 in which is mounted a reciprocatory piston 2 secured to one end of a piston rod 3 which works through a stuffing box 4 connected with the head at one end of the cylinder 1. The stuffing box 4 contains a sleeve-like gland 5 having a square bore to receive the piston rod 3 which is also square in cross section. A saw blade tilting handle 6 is secured to a projecting end of the gland 4 by means of a key 7 or the equivalent thereof so that by turning the handle 6, the piston rod 3 may be correspondingly turned for the purpose of adjusting the angle of the saw blade 8 which is secured to and carried by the end of the piston rod 3.

A head or stock 9 is secured to the saw blade as illustrated in Fig. 1 by one or more fasteners 10 such as bolts which may be removed for the purpose of detaching the saw from the piston rod 3 and enabling the same to be temporarily attached to the flanges 11 of a bearing arm 12 as indicated by dotted lines at the bottom of Fig. 1 for transportation purposes, the smaller end of the saw blade 8 being formed with a curved slot 13 designed to receive a pin 14 projecting from a hanger 15 pivotally connected to the rear end of a sliding support 16 and having an operating handle 17 to facilitate engaging the pin 14 with the slot 13. The sliding support 16 is mounted to reciprocate through guides 18 projecting from the cylinder 1. When the saw is not in operation, pins 19 may be inserted through the guides 18 and through the sliding support 16. The bearing arm 12 is secured to the sliding support 16 by fastening means 20. Therefore the piston rod 3 and the sliding support 16 reciprocate simultaneously in parallel planes and both assist in directing the saw blade 8 in a rectilinear path thus insuring an accurate cutting of the pile represented at 21.

Arranged at one side of the cylinder 1 and extending longitudinally thereof is a valve chest 22 having an inlet 23 for compressed air or other fluid under pressure. Mounted to reciprocate in the chest 22 is a slide valve 24 having stems 25 projecting from the opposite ends thereof and working through stuffing boxes 26 at opposite ends of the valve chest. Extending parallel to the stems 25 is a threaded and longitudinally movable rod 27 having right and left hand threads 28 as shown in Fig. 1. The stems 25 are connected to the rod 27 by connecting pieces or yokes 29 so that as motion is imparted to the rod 27, corresponding movement is imparted to the slide valve 24. The actuation of the rod 27 is effected by the piston 2 which in its reciprocatory movements comes alternately into contact with a pair of tappets 30 which are threaded on the rod 27. The piston 2 does not come directly in contact with the tappets 30 but said piston carries with it a runner 31 formed in its inner face with a groove 32 which receives a portion of the periphery of said piston as shown in Figs. 1 and 3. The rod 27 passes through the runner 31 and the cylinder 1 is formed with a longitudinal guide-way 33 in which is located the rod 27 and in which the runner 31 is guided.

The valve 24 is formed with a central longitudinal air passage 34 which communicates with a pair of ports 35 and 36 which intersect the ends of the passage 34 as shown in Fig. 4. The valve chest 22 is formed with longitudinal air passages 37 which communicate alternately with the valve 24 by means of ports 38 and 39. The air escapes through exhaust ports 40 and 41 formed in the valve chest 22 and located opposite the ports 38 and 39 as shown in said Fig. 4. The stems 25 of the slide valve have piston-like enlargements 42 located just beyond the opposite ends of the valve body and equipped with packing rings 43 to prevent leakage of air. Chambers 44 and 45 at opposite ends of the valve chest communicate directly with the opposite ends of the cylinder at the points 46 and 47 and also communicate with the air passages 36 and 37 by means of ports 48 and 49. By now comparing Figs. 1 and 4 it will be seen that the compressed air or other fluid entering at 23 passes through the ports 35 and 38, the passage 37, the port 48, the chamber 44 and the port 46 and drives the piston 2 to the right. On the return movement of the piston, the air which has been acting thereon passes back by the same course but escapes directly through the exhaust port 40 to the atmosphere, the exhaust position of the ports being illustrated at the right hand side of Fig. 4, the air passing between the adjacent end of the valve body 24 and the adjacent piston-like enlargement 42 and around the intervening portion of the stem 25.

In beginning the sawing operation, it is advisable to employ comparatively short strokes and therefore the tappets 30 are adjusted closer together by turning the rod 27 in the proper direction with the aid of a crank handle 50 on one end of said rod. As the sawing progresses, the operator turns the shaft or rod 27 in a direction which will cause the tappets 30 to move away from each other thereby enabling a longer stroke to be obtained. As the runner 31, which is actuated by the piston 2, approaches either end of its stroke, it contacts with the adjacent tappet 30 and thereby shifts the slide valve 24 so as to open the inlet ports at the opposite side of the piston thereby driving the piston on its return stroke. The operation is thus entirely automatic and the length of stroke of the piston and consequently the saw blade may be adjusted and operated by the handle 50. The saw blade 8 may be tilted if desired by means of the handle 6 which turns the gland 5 through which the piston rod 3 reciprocates.

By adjusting the tappets 30 toward or away from each other, the length of the stroke of the saw may be regulated, short or long strokes being obtained according to the particular requirements at the time. The length of stroke may be varied while the saw is in operation by merely grasping the handle 50 and rotating the shaft 27 in the appropriate direction.

I claim:—

1. A compressed air motor comprising a cylinder, a reciprocatory piston working therein, an automatic air controlling slide valve, a piston rod extending from said piston through a head of the cylinder, means including tappets for varying the stroke of the piston and means whereby said tappets may be simultaneously adjusted to vary the stroke during the operation of the motor.

2. A compressed air motor comprising a cylinder, a reciprocatory piston working therein, an automatic air controlling slide valve, a piston rod extending from said piston through a head of the cylinder, a tappet rod extending lengthwise of said cylinder, tappets mounted on right and left hand threaded portions of said tappet rod at opposite sides of the piston and means for rotating the tappet rod to shift the tappets toward and away from each other, said tappets being arranged to be actuated by the piston and the tappet rod being yoked to the slide valve.

3. A compressed air motor comprising a cylinder, a reciprocatory piston working therein, an automatic air controlling slide valve, a piston rod extending from said piston through a head of the cylinder and means for varying the length of the stroke of the piston, said means comprising a rotatable tappet rod extending lengthwise of the cylinder, stems extending from opposite ends of the slide valve, yoke pieces connecting said stems with the tappet rod, tappets mounted on left and right hand threaded portions of said tappet rod at opposite sides of the piston and a runner movable on said rod and actuated by said piston and adapted to contact with said tappets for shifting the sliding valve.

4. A compressed air motor comprising a cylinder, a reciprocatory piston working therein, an automatic air controlling slide valve, a piston rod extending from said piston through a head of the cylinder, means for varying the length of the stroke of the piston, said means comprising a rotatable tappet rod and extending lengthwise of the cylinder, stems extending from opposite ends of the slide valve, yoke pieces connecting said stems with the tappet rod, tappets mounted on right and left hand threaded portions of said tappet at opposite sides of said piston, a runner movable on said rod and actuated by said piston and adapted to contact with said tappets for shifting said slide valve, the cylinder being formed with an internal guideway in which said runner moves, the said runner being formed with a groove to receive said piston and admit of a turning movement of the latter.

5. A compressed air motor comprising, a cylinder, a reciprocatory piston working therein, an automatic air controlling slide valve, a piston rod extending from said piston through a head of the cylinder, means including tappets for varying the stroke of said piston and means whereby said tappets may be simultaneously adjusted to vary the stroke during the operation of the motor.

In testimony whereof I affix my signature.

HANS R. CHRISTIANSEN.